Jan. 20, 1948.   H. CLAYTON-WRIGHT   2,434,686
FLUID SEAL FOR SHAFTS AND BEARINGS OR THE LIKE
Filed July 19, 1944

INVENTOR.
Howard Clayton-Wright.
BY
Harness, Dickey & Pierce.
ATTORNEYS.

Patented Jan. 20, 1948

2,434,686

UNITED STATES PATENT OFFICE 2,434,686

FLUID SEAL FOR SHAFTS AND BEARINGS OR THE LIKE

Howard Clayton-Wright, Stratford-on-Avon, England, assignor to Simpson Catherwood Leonard, Detroit, Mich.

Application July 19, 1944, Serial No. 545,663
In Great Britain November 11, 1943

1 Claim. (Cl. 288—2)

This invention relates to fluid seals for shafts, bearings or the like of the type comprising a packing ring which is fixed between a shaft and a housing and is a push or tight fit on one of the parts by means of which it is stationarily held and has a resilient lip for pressing on the other rotating part. The invention has for its object a simple construction of sealing ring which is cheap to manufacture and efficient in use.

According to the present invention, the sealing ring is formed of rubber or rubberlike material and comprises an annular body which is a push fit into a cylindrical recess or housing surrounding a rotating shaft and has an annular resilient lip, the inner periphery of which tapers towards the shaft to form a seal thereon. In order to impart sufficient rigidity to the body of the ring so that it can be tightly pressed into the housing without detrimentally distorting its supporting position for the sealing lip, a metal or rigid ring is bonded to the inner side of the annular body or the side on which the annular sealing lip is directed. The periphery of the annular rubber body extends beyond the periphery of the metal ring so that an efficient seal is made with the wall of the stationary housing.

Referring to the drawings.

Figure 1:
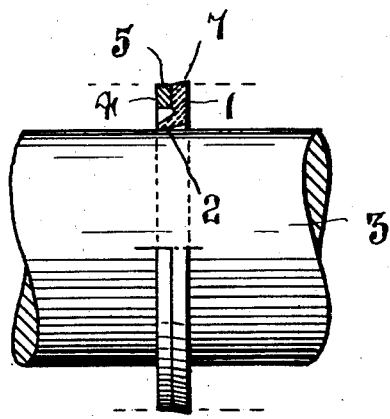
Figure 1 is a side elevation, part in section of a sealing ring.

According to one form of the invention, an oil seal comprises a ring or annular body 1 moulded from rubber or like elastic material and from the inner periphery a resilient annular lip 2 projects inwardly and laterally towards the shaft 3 to apply the sealing pressure, the lip 2 projecting on the inner side 4 of the ring that is to say the side on which the seal is made. On the inner face of the body of the ring a metal ring 5 is bonded during the moulding of the sealing ring in a mould and such ring conveniently comprising a flat washerlike member pressed from sheet metal or otherwise suitably made. This ring is a sliding or push fit in the cylindrical recess in the housing of a bearing and the periphery of the rubber body enlarges outwardly to the outer side of the sealing ring to form a conical surface or sealing lip 7, the tip of which is of larger diameter than the ring at the inner side. When the oil seal is pressed into the housing, the end of smaller diameter enters the housing first which facilitates the assembly of the ring with a push fit and the larger end or sealing lip 7 can be compressed to form a good sealing fit in the housing, and the metal washer prevents distortion of the body of the ring.

Figure 2:
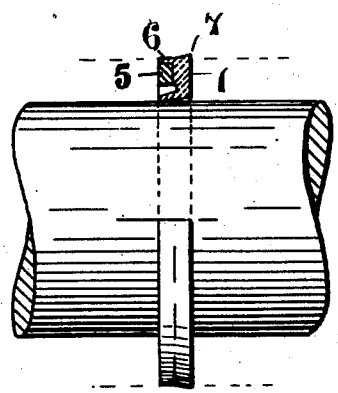
Figure 2 is a similar view to Figure 1, showing a further form.

In the form shown by Figure 2, a thin annular flange 6 of rubber is moulded around the periphery of the ring 5, the flange 6 being integral with the body 1.

Figure 3:
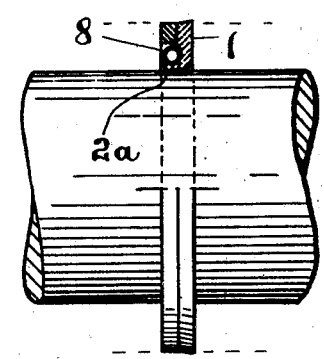
Figure 3 is a similar view to Figure 1 showing a modified form of the invention.

The annular resilient sealing lip 2 may be such that it presses on the shaft with its own inherent elasticity to form the seal, but the lip 2a (Figure 3) may be shaped to hold a garter spiral spring 8 to press the finger on the shaft.

By reversing the sectional shape of the ring, such ring can be fixed on a stationary shaft with the sealing lip pressed on a rotating outer member.

In a further form a metal washer may be bonded on both sides of the body of the ring, with the tapering periphery projecting beyond the periphery of both washers.

The reinforcing ring lies at the inner face of sealing ring and prevents the body of the ring being distorted whilst being a push fit in the housing for the bearing. It also gives rigidity to the body so that the sealing lip 2, whilst being resiliently supported is sufficiently held to permit of the lip applying the required sealing pressure. The lip 7 sealing the wall of the housing is resiliently supported by the body 1 of the ring so that a firm pressure seal is obtained, whilst the periphery of the body of the ring is a push fit in the housing and is accurately registered in the housing with the lip accurately arranged concentric around the shaft. The ring is arranged so that the smaller end is first pushed into the recess in the housing to facilitate assembly. The washer or ring 5 forms the inner face of the body of the sealing ring.

I claim:

A fluid sealing device for shafts, bearings or the like for fitting in an annular space between a rotating part and a stationary part to which it is fixed by its periphery gripping one of the parts, comprising a ring of rigid material in the shape of a washer having a peripheral surface for press fit engagement with one of the parts and a peripheral surface spaced from the other of the parts, and a ring of rubber or rubberlike material formed of an annular body bonded to one face of said rigid ring material between said peripheral surfaces, one edge of said rubber ring overlapping the peripheral surface of said rigid ring which is spaced from one of the parts and having its opposite edge tapered with one side thereof being flush with the opposite peripheral surface of said rigid material and the opposite side of the edge projecting beyond the peripheral surface of said rigid material.

HOWARD CLAYTON-WRIGHT.

REFERENCES CITED

The following references are of record in the file of this patent:

UNITED STATES PATENTS

| Number | Name | Date |
| --- | --- | --- |
| 2,210,723 | Kosatka | Aug. 6, 1940 |
| 2,008,682 | Christenson | July 23, 1935 |
| 2,249,141 | Johnson | July 15, 1941 |